MAGNETIC SCANNING HEAD

Filed July 15, 1960

INVENTOR.
DENNIS GABOR

BY

Brumbaugh, Free, Graves & Donohue his ATTORNEYS

United States Patent Office 3,175,049
Patented Mar. 23, 1965

3,175,049
MAGNETIC SCANNING HEAD

Dennis Gabor, London, England, assignor to Minnesota Mining & Manufacturing Company, St. Paul, Minn., a corporation of Delaware Filed July 15, 1960, Ser. No. 43,076
4 Claims. (Cl. 179—100.2)

This invention relates to means for recording signals on magnetic tapes and, more particularly, to a new and improved signal recording magnetic scanning head that has no moving mechanical elements.

The copending application of D. I. Tchernev and C. D. Mee, Serial No. 33,148, filed June 1, 1960, for "Magnetic Scanning Head" discloses a novel and highly effective magnetic scanning head for recording signals. Briefly, this head comprises a stack of magnetic laminations having a nonmagnetic gap, and means for providing a linear magnetic potential drop across these magnetic laminations to cause a saturating magnetic flux to be developed therein, such that there is only one effective recording lamination. By applying suitable scanning signals to windings on scanning cores in inductive relation to the laminations, the effective recording lamination can be linearly displaced to record a track on a magnetic medium.

The present application is addressed to a novel magnetic scanning head of this general character in which the linear magnetic potential drop across the stack of magnetic laminations is produced by magnetizing ampere turns arranged to vary with the distance along the stack in accordance with a known relation. In a preferred embodiment, the linear magnetic potential drop is produced by a laminated member carrying winding means, the turns of which effect linkages with the laminations of the base member that vary with distance therealong in such fashion as to develop a linear magnetic potential drop across the base member. This causes a saturating magnetic flux to be established in the laminations except at a predetermined location therein. Second winding means inductively coupled to the base member and the stack of magnetic laminations varies the distribution of the saturating magnetic flux set up by the first winding means so as to displace the unsaturated recording location linearly along the stack, and a signal winding inductively coupled with the stack of laminations and the base member causes a signal magnetic flux to be established at the recording location.

For a better understanding of the invention reference is made to the following detailed description of a representative embodiment, taken in conjunction with the accompanying drawing in which.

Figure 1:
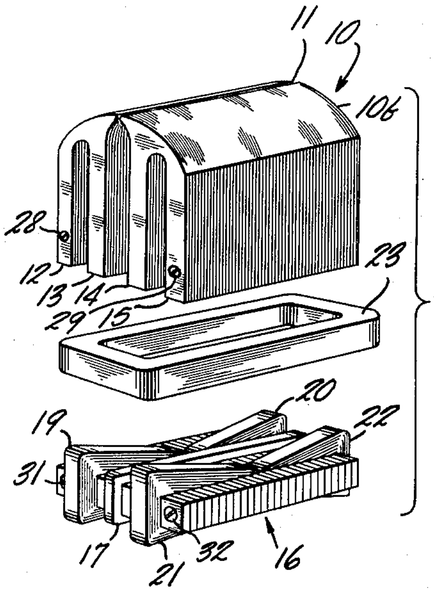
FIG. 1 is an exploded view of a magnetic scanning head constructed in accordance with the invention.
Figure 2:
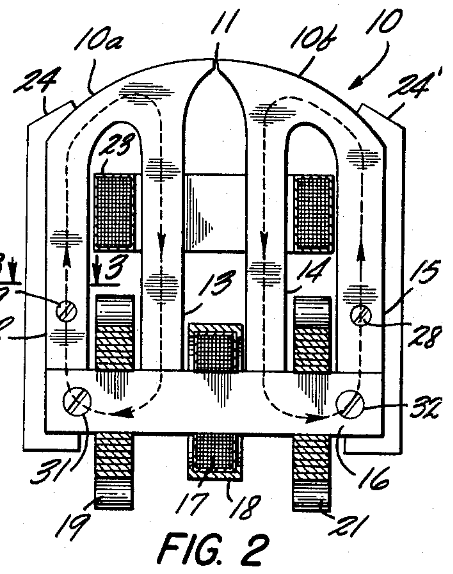
FIG. 2 is an end view, partly in section, of the scanning head shown in FIG. 1.
Figure 4:
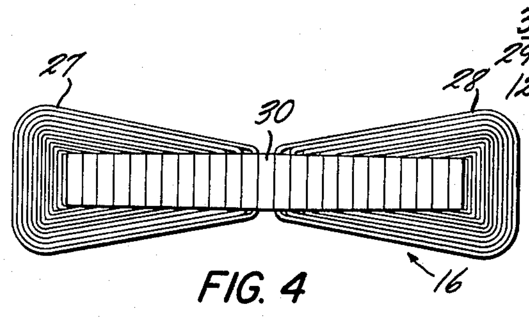
FIG. 4 is a view of the base member for the scanning head shown in FIGS. 1–3, inclusive.

Referring first to FIG. 2, the magnetic head 10 comprises adjacent pole pieces 10*a* and 10*b* separated by a narrow gap 11. The pole pieces 10*a* and 10*b* are provided with legs 12, 13 and 14, 15, respectively, which extend rearwardly to a base member 16. The base member 16 carries a signal winding 17, preferably enclosed in a magnetic shield 18 which may be made of Mumetal, for example, and a plurality of saturating windings 19, 20 and 21, 22 (FIG. 1). A scanning coil 23 surrounds the legs 13 and 14 of the pole pieces 10*a* and 10*b*. The pole pieces 10*a* and 10*b* and the base member 16 are secured in assembled relationship by any suitable means such as the clamps 24 and 24′, which are preferably made of nonmagnetic material.

Figure 3:
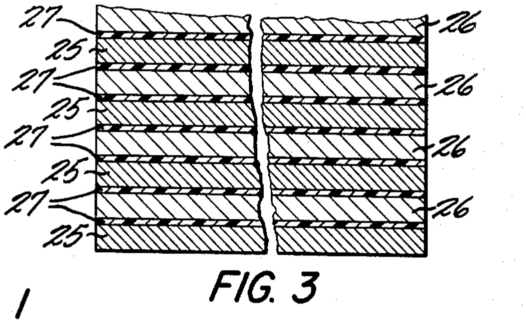
FIG. 3 is a view taken along the line 3—3 of FIG. 2.

The pole pieces 10*a* and 10*b* are preferably formed of stacked laminations 25 made of a magnetic material such as permalloy, separated by spacers 26 make of a nonmagnetic material such as copper, a leaf 27 of insulating material 28 such as Mylar being interposed between adjacent laminations 25 and spacers 26, as shown in FIG. 3. The stacked laminations 25, spacers 26 and insulating leaves 27 may be secured together in any suitable manner as by through bolts 28 and 29. The rear ends of the legs 12, 13, 14 and 15 of the pole pieces 10*a* and 10*b* are ground or lapped flat so as to conform to the upper surface of the base member 16.

The base member 16 includes a stack of substantially rectangular uninsulated laminations 30 secured together in any suitable manner as by throughbolts 31 and 32. The saturating coils 19, 20, 21 and 22 which may be made of insulated copper strip, are wound through the laminations 30 in such fashion that the number of turns linking each lamination increases linearly from the center of the stack to the opposite ends thereof. Preferably, the laminations 30 are grooved at 33 and 34 (FIG. 5) to receive successive turns of the saturating coils. Consequently, when current flows through the saturated windings 19, 20, 21 and 22, the flux density will have a relatively large value in the end laminations of the stack and will decrease linearly in magnitude going towards the center of the stack, the flux density in the center lamination being approximately zero. The signal winding 17 is wound in a conventional manner around the entire stack of laminations 30, as shown in FIG. 1.

Figure 5:
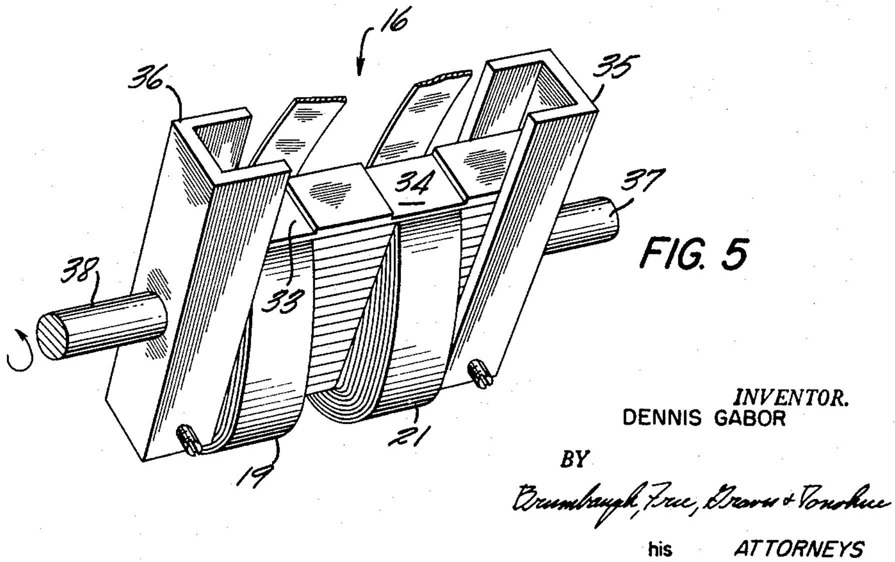
FIG. 5 is an illustration of a preferred method of assembling the base member shown in FIG. 4.

A preferred method of assembling the base member 16 is shown in FIG. 5. It utilizes a winding jig having opposed channels 35 and 36 fastened to two rotating shafts 37 and 38, respectively. As the channels rotate, the windings 19 and 21 are wound in the grooves 33 and 34 of the laminations 30, an additional lamination being slipped in after each turn of the coils 19 and 21 is completed. In this way, successive laminations after the first are linked by successively fewer turns, the relation being linear. The base member may be assembled in two parts, one having the coil sections 19 and 21, and the other having the coil sections 20 and 22, the two parts then being assembled together by the bolts 31 and 32.

In operation, a relatively high D.C. current is passed through the saturating coils 19, 20, 21 and 22 on the base member 16. These coils are connected in such a manner that the windings 19 and 22 cause a saturating flux to flow in one direction in the laminations 30, while the coils 20 and 21 cause a saturating flux to flow in the opposite direction. As best shown in FIG. 2, the magnetic flux developed by the coils 19 and 20 follows a path through the legs 12 and 13 of the pole piece 10*a* and the base member 16; has the polarity at one end of the pole piece 10*a* indicated by the arrows in FIG. 2; decreases linearly to zero at the center; and increases linearly in opposite polarity from the center to a maximum value at the opposite end of the pole piece 10*a*.

Similarly, the magnetic flux developed by the coils 21 and 22 follows a path through the legs 14 and 15 of the pole piece 10*b* and the base member 16; has the polarity at one end of the pole piece 10*b* indicated by the arrows in FIG. 2; decreases linearly to zero at the center of the pole piece; and increases linearly in opposite polarity from the center to a maximum value at the opposite end of the pole piece 10*b*.

The nonmagnetic spacers 26 in the pole pieces 10*a* and 10*b* cause nearly all of the saturating flux to flow in the planes of the laminations 25 with the result that there is practically no transverse flux flowing through the pole pieces. The magnitude of the D.C. current flowing through the saturating coils 19, 20, 21 and 22 is made large enough so that all of the laminations 25 in the pole pieces 10a and 10b carry a saturating magnetic flux with the exception of one lamination intermediate the ends of the pole pieces.

By applying to the scanning coil 23 a varying current, such as a sawtooth wave, for example, the position of the single unsaturated lamination can be moved to different locations between the ends of the gap 11. The magnetomotive force created by this current establishes a scanning magnetic flux in the legs 12, 13, 14 and 15 of the pole pieces 10a and 10b which alternates in polarity. This scanning magnetic flux is superimposed upon the saturating flux in the laminations 25 in such fashion as to move the position of the single unsaturated lamination from one end of the air gap to the other.

If, now, a signal is impressed upon the signal winding 17, it will develop a corresponding magnetic flux value in the gap 11 at the location of the unsaturated lamination. Hence, if a magnetic tape as wide as the gap 11 is transported past the gap 11 as signals are applied to the winding 17, such signals will be recorded in a succession of tracks extending transversely of the tape.

In a practical magnetic head according to the invention, the pole pieces 10a and 10b may each comprise a stack of 400 permalloy stampings .002 inch thick, spaced by .002 inch copper and .0005 inch Mylar spacers, the total length of each stack being about 2 inches. The base member may be formed of 400 laminations 30 .002 inch thick under the saturating coils, but built up to .005 inch at the center and at the sides so as to form the recesses 33 and 34 (FIG. 5). The saturating coils 19, 20, 21 and 22, may be wound of .002 inch copper strip, say, .160 inch wide and insulated on both sides by .0005 inch Mylar strips slightly wider than the copper strip. The saturating current in the windings 19, 20, 21 and 22 may be of the order of 1 or 2 amperes.

The invention thus provides a novel and highly effective scanning head for use in recording or reproducing operations involving magnetic tape. By synchronizing the scanning wave applied to the scanning coil with a video or other signal prerecorded on a tape, the prerecorded signal can be reproduced by drawing the tape across the gap in the magnetic head in a direction parallel to the plane of the pole piece laminations. Since there are no moving parts, operation and maintenance are greatly simplified, and wear is reduced.

Among other advantages that might be mentioned are the complete absence of magnetic flux in the direction normal to the laminations 25 and the fact that the saturation path does not extend into the recording gap 11. The latter feature is of considerable importance when replaying a tape in replay operations.

A further very important advantage of the applicant's magnetic scanning head is that satisfactory operation can be obtained without the necessity for maintaining a high degree of accuracy in manufacture.

While the unsaturated lamination 30 in the embodiment described above is at the center of the stack when no scanning current is applied to the coil 23, it will be understood that it could be located at other positions intermediate the ends of the stack by appropriate modification of the windings 19, 20, 21 and 22. Also, the unsaturated region may be made to include several laminations instead of one, for example, by leaving two laminations between the inner ends of the windings 19, 20 and 21, 22, and winding these coils so that two laminations are inserted after each turn. Other modifications will be apparent to persons skilled in the art to which this invention pertains.

The particular embodiment shown and described herein is intended to be merely illustrative, and the invention is not to be construed as limited thereto. On the contrary, it is intended to encompass all modifications thereof coming within the scope of the following claims.

I claim:

1. In a magnetic scanning head, the combination of stacked laminations forming a base member and pole pieces extending away therefrom and having opposed pole faces defining a nonmagnetic gap, the said pole pieces being composed of a plurality of laminations separated by nonmagnetic spacers, each of said pole pieces being formed at the end which contacts the base member so as to magnetically link portions of said base member to form a complete magnetic flux path within the said pole pieces and said base member, first winding means having turns linkage certain of said base member laminations in the vicinity of one of said pole pieces such that the number of turns of said winding linking each of said certain laminations varies with its position in the stack, second winding means having turns linking certain of said base member laminations in the vicinity of the other of said pole pieces such that the number of turns linking each of said last named laminations varies with its position in the stack, whereby magnetic flux generated by energizing said windings is confined to a flux path within each of said pole pieces, respectively, third winding means in inductive relation to both of said pole pieces and signal winding means in inductive relation to both of said pole pieces and said nonmagnetic gap.

2. A magnetic scanning head comprising stacked magnetic laminations forming opposed poles separated by a nonmagnetic gap, the said poles being formed of a number of magnetic sheets separated by nonmagnetic spacers, and the said poles being connected by a laminated magnetic base member, each of said pole pieces being formed at the end opposite the said gap to magnetically link portions of said base member to form a complete magnetic flux path within said pole piece and said base member, said base member being magnetically coupled to said pole pieces to form a magnetic flux path through said pole pieces and said nonmagnetic gap, first winding means inductively coupled with said base member and each of said pole pieces in such fashion that a linear magnetic potential drop is established across the stacked laminations when current flows through said first winding means, second winding mean inductively coupled with said base member and said pole pieces for varying the distribution of the magnetic flux field in each of said laminations, and third winding means inductively coupled with said stack of laminations and said base member for causing a signal flux to flow through said stack of laminations along a path that includes said nonmagnetic gap.

3. A scanning head comprising opposed poles formed from a plurality of interleaved magnetic and nonmagnetic laminations, said poles being separated by a nonmagnetic gap and the individual magnetic laminae of the pole pieces being arranged in confronting relationship to form a plurality of recording gaps, a magnetic base member magnetically coupled with said poles, each of said poles being formed at the point of contact with the said base member to form a complete magnetic flux path within said pole piece and a portion of said magnetic member, said member including a plurality of stacked magnetic elements having recesses formed therein to receive the turns of a plurality of first windings, said first windings being wound on said member in such fashion that a linear magnetic potential drop is established across said member increasing linearly outwardly from the center of said member, said linear magnetic potential drop being adapted to establish a saturated magnetic flux in all of said laminations in each of said poles except at a given location in said head, second winding means inductively coupled with both of said poles and said base member for varying the distribution of the said saturating magnetic flux in all of said magnetic laminations, and third winding means inductively coupled with said poles and said member for causing a signal magnetic flux to flow through said pole pieces and said magnetic member in a flux path that includes said recording gaps.

4. A scanning head comprising a plurality of stacked interleaved magnetic and nonmagnetic laminations forming opposed poles separated by a nonmagnetic gap, the magnetic laminae of said poles being arranged in confronting relationship to form a plurality of recording gaps, each of said poles being formed in a U shape at the end opposite that forming the nonmagnetic gap adapted to contact the adjoining portion of a base member so as to form a complete magnetic flux path through said base member and within said pole piece, said base member being made of laminated magnetic material and having a plurality of openings formed therein, first windings wound on said member and passing through said openings, said first windings being wound in such fashion that a maximum number of turns link the outer extremities of said base member and the number of turns linking the remainder of said base member decreases linearly in the direction of its center, said first windings being adapted to cause a linear magnetic potential drop to be established across said base member when current flows therethrough to establish a saturating magnetic flux in said magnetic laminations within each of the said pole pieces but not including said recording gaps, second winding means inductively coupled with said poles and said base member for varying the distribution of said saturating magnetic flux with respect to each lamination of the said pole pieces, and third winding means inductively coupled with said pole pieces and base member for establishing a signal magnetic flux in a magnetically unsaturated pair of said magnetic laminations along a flux path that includes a portion of said pole pieces and the associated recording gap.

References Cited by the Examiner

UNITED STATES PATENTS

| | | | |
|---|---|---|---|
| 2,674,659 | 4/54 | Buhrendorf ---------- | 179—100.2 |
| 2,674,031 | 4/54 | Buhrendorf ---------- | 29—155.57 |
| 2,676,392 | 4/54 | Buhrendorf ---------- | 29—155.58 |
| 2,677,019 | 4/54 | Buhrendorf ---------- | 179—100.2 |
| 2,743,320 | 4/56 | Daniels et al. -------- | 179—100.2 |
| 2,955,169 | 10/60 | Stedtnitz ------------- | 179—100.2 |

FOREIGN PATENTS

| | | |
|---|---|---|
| 1,026,974 | 3/58 | Germany. |

IRVING L. SRAGOW, *Primary Examiner.*

NEWTON N. LOVEWELL, B. KONICK, *Examiners.*